(12) United States Patent
Osanai et al.

(10) Patent No.: US 10,960,952 B2
(45) Date of Patent: Mar. 30, 2021

(54) HANDLEBAR SWITCH DEVICE FOR SADDLED VEHICLE

(71) Applicant: HONDA MOTOR CO., LTD., Tokyo (JP)

(72) Inventors: Takuya Osanai, Wako (JP); Yutaka Kikuchi, Wako (JP); Masaru Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 16/465,472

(22) PCT Filed: Jan. 23, 2017

(86) PCT No.: PCT/JP2017/002068
§ 371 (c)(1),
(2) Date: May 30, 2019

(87) PCT Pub. No.: WO2018/134989
PCT Pub. Date: Jul. 26, 2018

(65) Prior Publication Data
US 2020/0062332 A1    Feb. 27, 2020

(51) Int. Cl.
*B62K 23/02*    (2006.01)
*B62K 11/14*    (2006.01)
*H01H 9/06*    (2006.01)

(52) U.S. Cl.
CPC .............. *B62K 23/02* (2013.01); *B62K 11/14* (2013.01); *H01H 9/06* (2013.01); *H01H 2009/068* (2013.01)

(58) Field of Classification Search
CPC ... B62K 23/02; B62K 11/14; H01H 2009/068
See application file for complete search history.

(56) References Cited

U.S. PATENT DOCUMENTS 6,225,584 B1    5/2001  Ase et al.
8,006,798 B2 *  8/2011  Portelance ............. B62K 5/027
                                                180/336

(Continued)

FOREIGN PATENT DOCUMENTS

JP    62094447 A  *  4/1987
JP    2000-168660 A    6/2000

(Continued)

OTHER PUBLICATIONS

International Search Report, issued in PCT/JP2017/002068, dated Mar. 28, 2017.

*Primary Examiner* — Vicky A Johnson
(74) *Attorney, Agent, or Firm* — Birch, Stewart, Kolasch & Birch, LLP

(57) ABSTRACT

A handlebar switch device for a saddled vehicle is provided in which a handlebar switch case and a handlebar grip that is disposed on an outside in a vehicle width direction of the handlebar switch case are mounted on a handlebar forming part of a steering handle. A sub switch case is supported on a stay that is selected from a plurality of kinds of stays that can be mounted on the handlebar at a fixed relative position with respect to the handlebar switch case while being adjacent to the handlebar switch case from an inside in the vehicle width direction. This enables a sub switch case to be additionally disposed without impairing the ease of operation of a switch of the handlebar switch case.

6 Claims, 14 Drawing Sheets

(56) References Cited

U.S. PATENT DOCUMENTS

| | | | |
|---|---|---|---|
| 2005/0035856 A1 | 2/2005 | McMahon | |
| 2005/0229736 A1* | 10/2005 | Iguchi | B62K 11/14 |
| | | | 74/473.3 |
| 2015/0274246 A1 | 10/2015 | Ichikawa et al. | |
| 2016/0059924 A1* | 3/2016 | Watanabe | B62K 11/14 |
| | | | 200/5 A |
| 2020/0062332 A1* | 2/2020 | Osanai | B62K 11/14 |

FOREIGN PATENT DOCUMENTS

| | | |
|---|---|---|
| JP | 2004-196297 A | 7/2004 |
| JP | 4762122 B2 | 8/2011 |
| JP | 2015-189444 A | 11/2015 |

\* cited by examiner

FIG.10
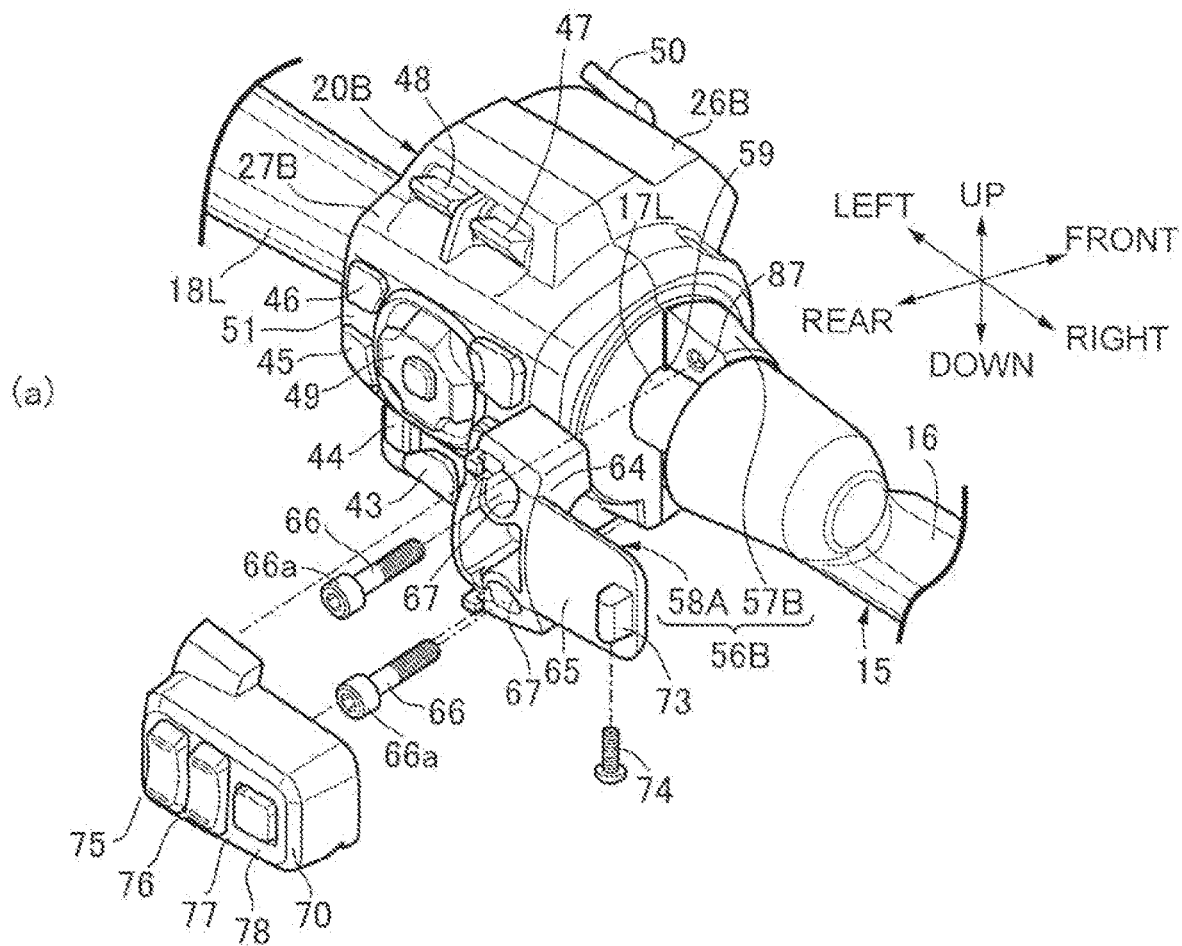
(a)
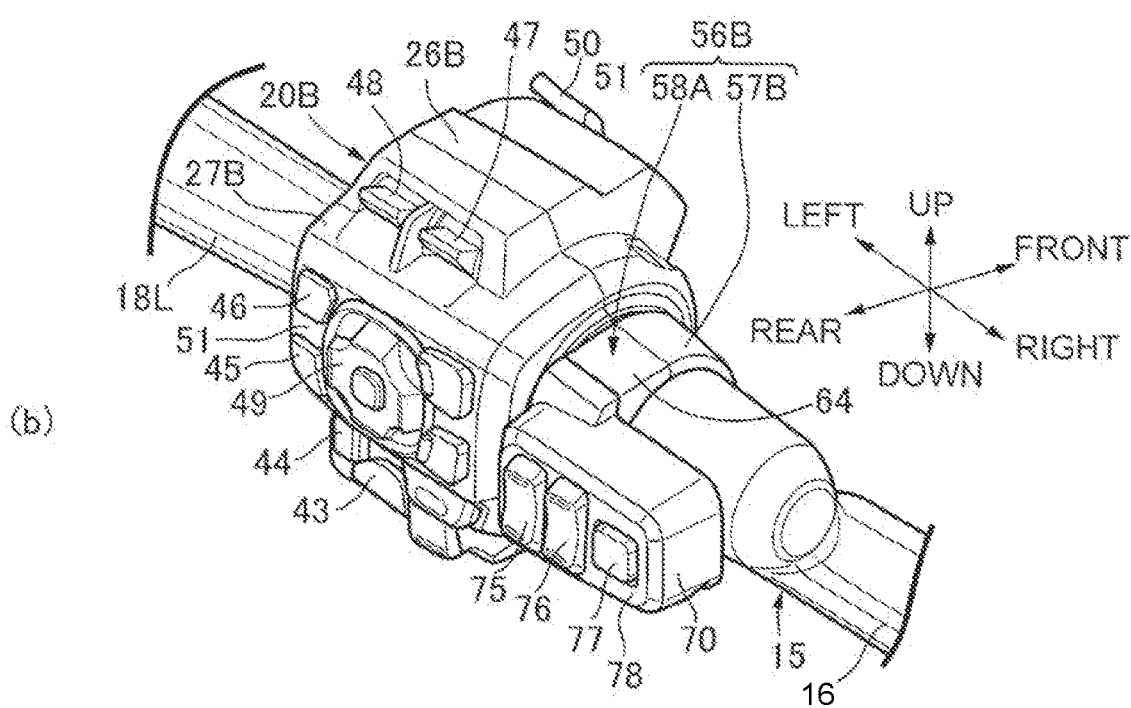
(b)

HANDLEBAR SWITCH DEVICE FOR SADDLED VEHICLE

TECHNICAL FIELD

The present invention relates to a handlebar switch device for a saddled vehicle in which a handlebar switch case and a handlebar grip that is disposed on an outside in a vehicle width direction of the handlebar switch case are mounted on a handlebar forming part of a steering handle.

BACKGROUND ART

When an additional sub switch case is mounted on handlebars of a two-wheeled motor vehicle in addition to a handlebar switch case, an arrangement in which a mounting space is ensured on the outside in the vehicle width direction of the handlebar switch case by extending the handlebars with extension means and the additional sub switch case is fixedly disposed in the mounting space is known from Patent Document 1.

RELATED ART DOCUMENTS

Patent Documents

Patent Document 1: Japanese Patent No. 4762122

SUMMARY OF THE INVENTION

Problems to be Solved by the Invention

In the arrangement disclosed in Patent Document 1 above, it is necessary to detach a handlebar grip when extending the handlebars, which takes time and effort. Furthermore, when the sub switch case is disposed on the outside of the handlebar switch case, the relative position, with respect to the handlebar grip, of a switch that is disposed on the handlebar switch case and is operated with relatively high frequency is changed, and the operation becomes difficult.

The present invention has been accomplished in light of such circumstances, and it is an object thereof to provide a handlebar switch device for a saddled vehicle such that when a sub switch case is additionally disposed the ease of operation of a switch disposed on a handlebar switch case is not impaired.

Means For Solving the Problem

In order to attain the above object, according to a first aspect of the present invention, there is provided a handlebar switch device for a saddled vehicle in which a handlebar switch case and a handlebar grip that is disposed on an outside in a vehicle width direction of the handlebar switch case are mounted on a handlebar forming part of a steering handle, characterized in that a sub switch case is supported on a stay that is selected from a plurality of kinds of stays that can be mounted on the handlebar at a fixed relative position with respect to the handlebar switch case while being adjacent to the handlebar switch case from an inside in the vehicle width direction.

Further, according to a second aspect of the present invention, in addition to the first aspect, the stay is formed from a front stay and a rear stay, the rear stay being selected from a plurality of kinds of rear stays including a specific rear stay that can support the sub switch case and being separably joined to the front stay with the handlebar sandwiched between the rear stay and the front stay in a vehicle fore-and-aft direction.

According to a third aspect of the present invention, in addition to the first or second aspect, the sub switch case is disposed so as to be adjacent to the handlebar switch case from the inside in the vehicle width direction.

According to a fourth aspect of the present invention, in addition to any one of the first to third aspects, the sub switch case is disposed so as to overlap part of the steering handle, including the handlebar, when viewed from a rear in a vehicle fore-and-aft direction.

According to a fifth aspect of the present invention, in addition to the second aspect, the specific rear stay is fastened to the front stay by means of a bolt having at a rear end in the vehicle fore-and-aft direction an enlarged diameter head portion that abuts against and engages with the specific rear stay, and the sub switch case is mounted on the specific rear stay so as to cover the enlarged diameter head portion.

According to a sixth aspect of the present invention, in addition to any one of the first to fifth aspects, a plurality of sub switches are disposed on the sub switch case, and among the sub switches a sub switch that is used at high frequency is disposed at a position biased toward the handlebar grip side from a middle part of the sub switch case in a longitudinal direction of the handlebar.

According to a seventh aspect of the present invention, in addition to the second or fifth aspect, one selected from the plurality of kinds of front stays, including a specific front stay that supports a clutch lever manually operated by a rider, is joined to the rear stay.

According to an eighth aspect of the present invention, in addition to any one of the first to seventh aspects, a second sub switch case that is different from the sub switch case can be mounted afterward on a front face in the vehicle fore-and-aft direction of the handlebar switch case.

A left handlebar 17L of an embodiment corresponds to the handlebar of the present invention, a left handlebar grip 18L of the embodiment corresponds to the handlebar grip of the present invention, left handlebar switch cases 20A, 20B of the embodiment correspond to the handlebar switch case of the present invention, a first front stay 57A of the embodiment corresponds to the specific front stay of the present invention, a first rear stay 58A of the embodiment corresponds to the specific rear stay of the present invention, and a wireless squelch switch 75, a wireless channel switch 76 and a CB switch 77 of the embodiment correspond to the sub switch of the present invention.

Effects of the Invention

In accordance with the first aspect of the present invention, since the sub switch case can be supported on a stay that is selected from a plurality of kinds of stays that are mounted on the handlebar at a fixed relative position with respect to the handlebar switch case while being adjacent to the handlebar switch case from the inside in the vehicle width direction, even when the sub switch case is provided in addition to the handlebar switch case, the fixed positions of the handlebar switch case and the sub switch case with respect to the handlebar grip can be maintained with good precision, thus enhancing the ease of operation.

Furthermore, in accordance with the second aspect of the present invention, since the stay is formed from the front stay and the rear stay, the stay can be mounted on the handlebar with a structure that is inexpensive and easy to use, and since the rear stay selected from the plurality of kinds of rear stays, including a specific rear stay that can support the sub switch case, is separably joined to the front stay, it is possible to use the front stay in common between a situation in which the sub switch case is provided and a situation in which it is not, thus enhancing the multi-purpose feature of the front stay and thereby reducing the cost.

In accordance with the third aspect of the present invention, since the sub switch case is disposed at a position adjacent to the handlebar switch case from the inside in the vehicle width direction, the operability of a switch disposed on the handlebar switch case will not be impeded by the sub switch case, thus enabling the operability to be maintained.

In accordance with the fourth aspect of the present invention, since the added sub switch case overlaps part of the steering handle when viewed from the rear in the vehicle fore-and-aft direction, the sub switch case is disposed at substantially the same height as the handlebar and a rider can easily operate with a thumb a sub switch disposed on the sub switch case, thus enhancing the ease of operation and avoiding narrowing the field of view of the rider due to the sub switch case being added.

In accordance with the fifth aspect of the present invention, since the specific rear stay, on which the sub switch case is mounted, is fastened to the front stay by means of the bolt having at the rear end along the vehicle fore-and-aft direction the enlarged diameter head portion, and the enlarged diameter head portion is covered by the sub switch case, the appearance is improved.

In accordance with the sixth aspect of the present invention, since a sub switch that is very frequently used is disposed on the sub switch case so as to be biased toward the handlebar grip side from a middle part of the sub switch case along the longitudinal direction of the handlebar, a rider can easily operate the sub switch, which is very frequently used.

In accordance with the seventh aspect of the present invention, since the clutch lever is supported on the specific front stay, which is one of the plurality of kinds of front stays, and the specific front stay forms part of a stay that has a fixed position with respect to the handlebar grip and the handlebar switch case defined with good precision, the ease of operation of the clutch lever can be enhanced by defining the relative position of the clutch lever with respect to the handlebar grip and handlebar switch case with good precision. Furthermore, the specific front stay, which supports the clutch lever, and a front stay that does not support the clutch lever share the rear stay, thus reducing the cost.

Moreover, in accordance with the eighth aspect of the present invention, since the second sub switch case, which is different from the sub switch case, can be attached afterward to the front face in the vehicle fore-and-aft direction of the handlebar switch case, it is possible to use the handlebar switch case in common between a situation in which the second sub switch case is provided and a situation in which it is not, and by so doing the cost can be reduced.

BRIEF DESCRIPTION OF DRAWINGS

FIG. 10 is a perspective view, corresponding to FIG. 5, in a state in which a clutch master cylinder is not mounted. (first embodiment)

MODES FOR CARRYING OUT THE INVENTION

An embodiment of the present invention is explained by reference to attached FIG. 1 to FIG. 14. In the explanation below, fore-and-aft, up-and-down, and left-and-right directions are directions as viewed by a person riding a two-wheeled motor vehicle.

First Embodiment

Figure 1:
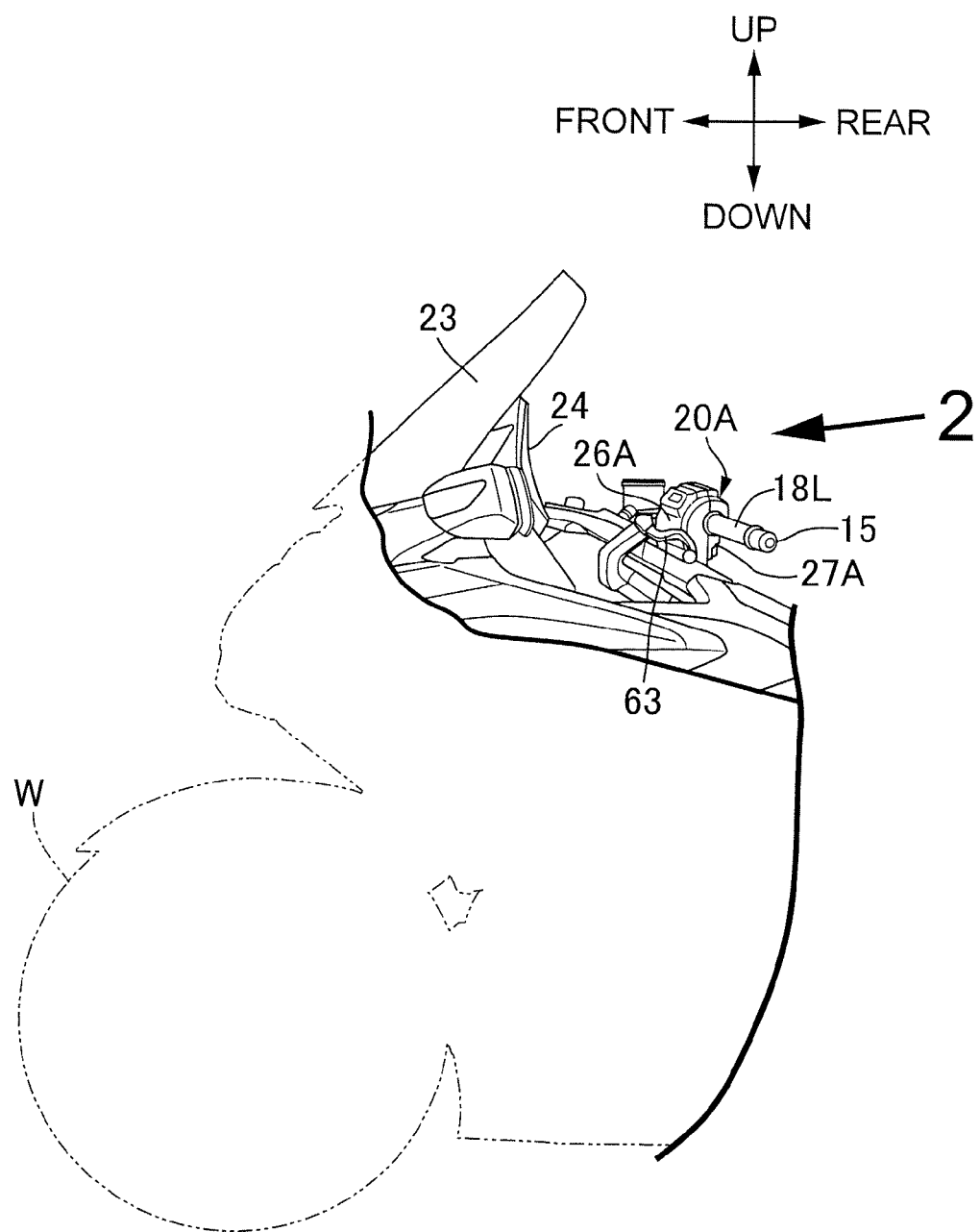
FIG. 1 is a left side view of a front part of a two-wheeled motor vehicle. (first embodiment)
Figure 2:
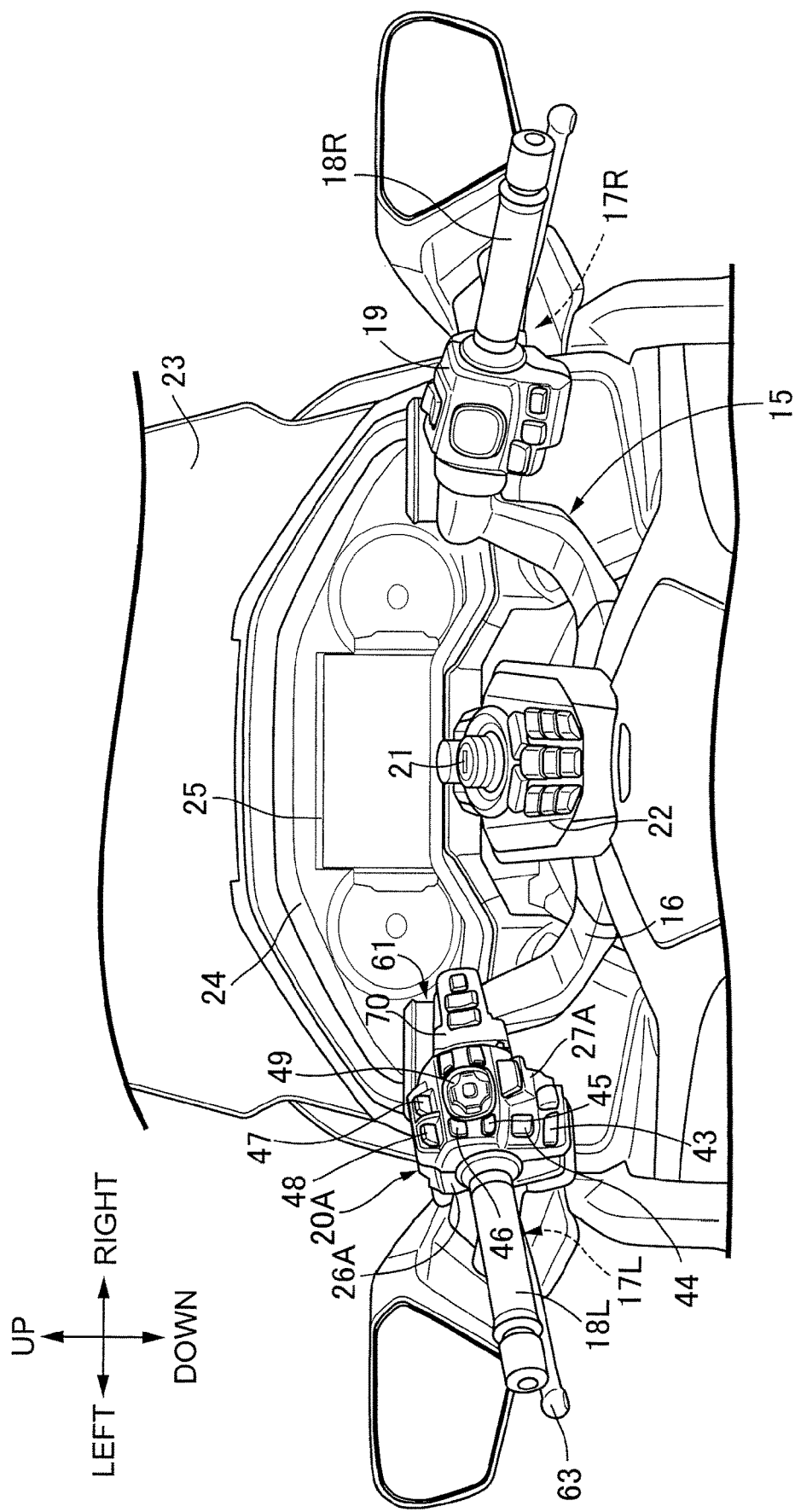
FIG. 2 is a view in the direction of arrow 2 in FIG. 1. (first embodiment)

First, in FIG. 1 and FIG. 2, a two-wheeled motor vehicle, which is a saddled vehicle, includes in its front part a steering handle 15 that steers a front wheel W, and the steering handle 15 are formed from a linking part 16 and a left handlebar 17L and right handlebar 17R that are linked to left and right upper end parts respectively of the linking part 16, the linking part 16 being linked to an upper end part of a front fork (not illustrated) axially supporting the front wheel W via a lower end part and being formed into a U shape opening upward.

A right handlebar grip 18R is provided on an extremity part of the right handlebar 17R, a right handlebar switch case 19 that is adjacent to the right handlebar grip 18R on the inside in the vehicle width direction is mounted on the right handlebar 17R, and an engine stop switch, etc. is disposed on the right handlebar switch case 19.

A main switch 21 and an audio unit 22 that is disposed to the rear of the main switch 21 are disposed on the linking part 16 of the steering handle 15, the audio unit 22 having the function of an FM tuner, a digital audio player unit, an MD deck, a cassette deck, an amplifier, etc.

A meter device 24 is disposed in front of the linking part 16, the meter device 24 being covered from the front by a windscreen 23 that can be raised and lowered, and a navigation display device 25 is disposed on a central part of the meter device 24.

Figure 3:
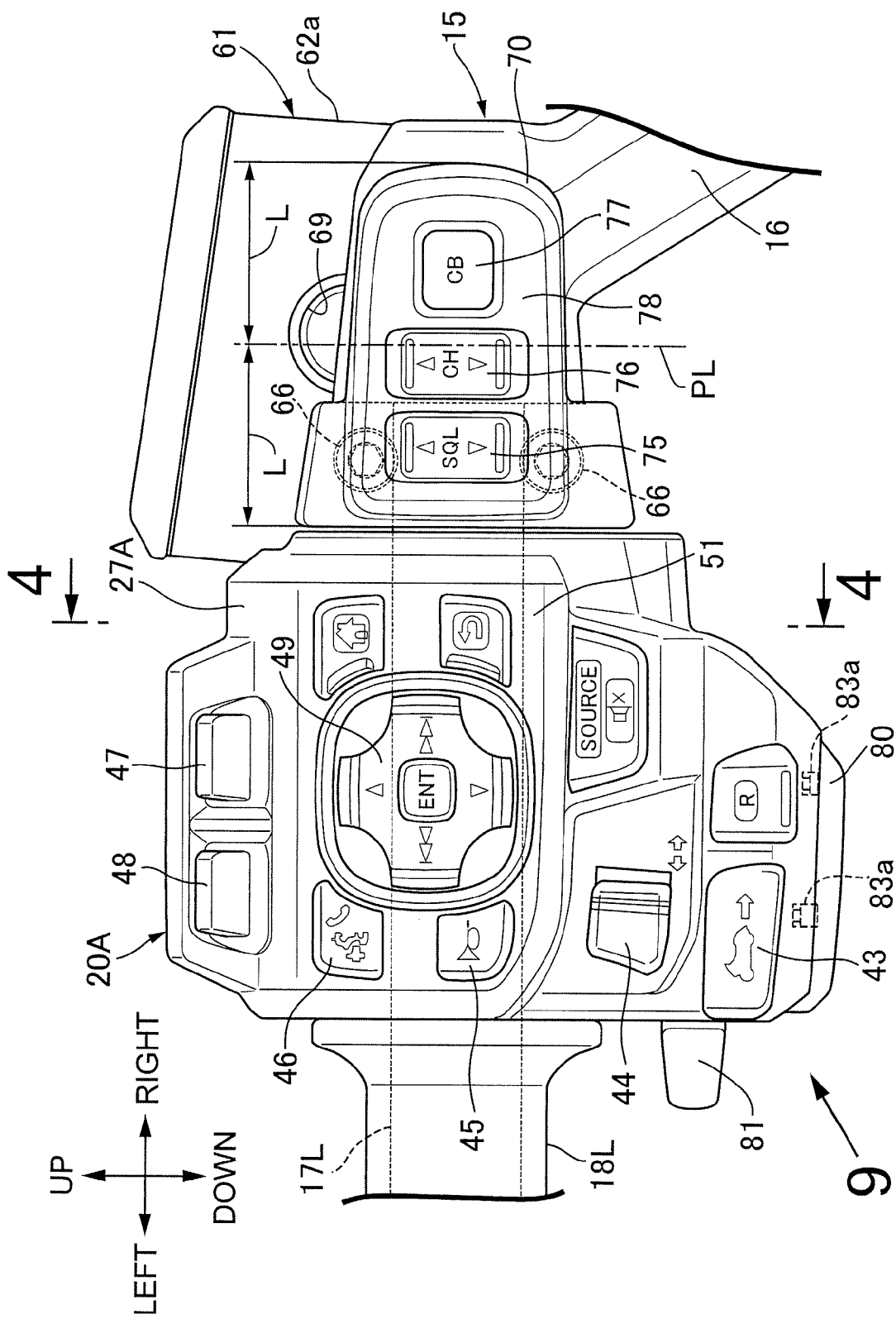
FIG. 3 is a front view showing part of a left handlebar. (first embodiment)
Figure 4:
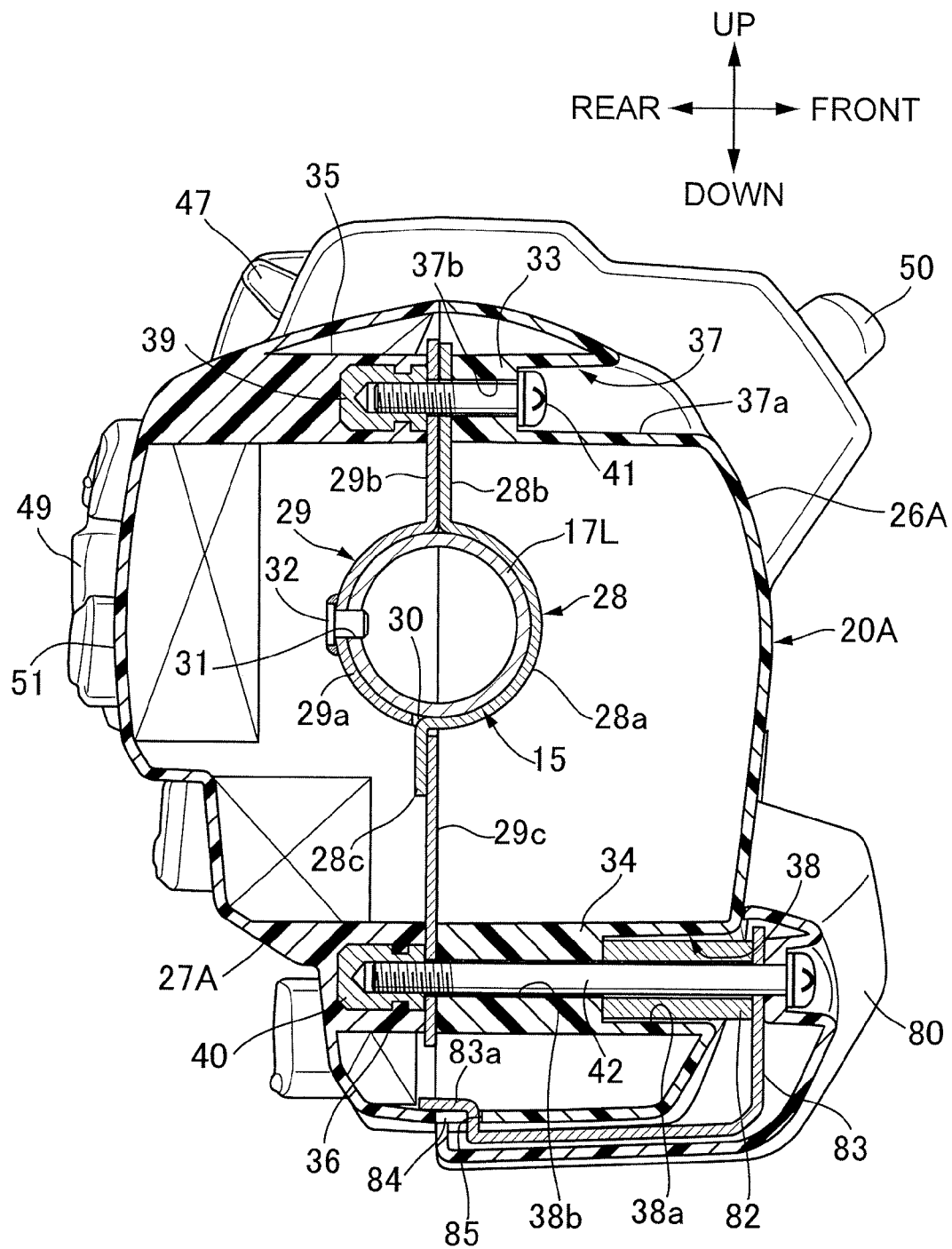
FIG. 4 is a sectional view along line 4-4 in FIG. 3 in a state in which the interior contents of a left handlebar switch case are omitted. (first embodiment)

Referring in addition to FIG. 3 and FIG. 4, mounted on the left handlebar 17L are a first left handlebar switch case 20A and a left handlebar grip 18L that is disposed on an extremity part of the left handlebar 17L on the outside in the vehicle width direction of the left handlebar switch case 20A.

The first left handlebar switch case 20A is formed by joining to each other a front case half body 26A and a rear case half body 27A that are made of a synthetic resin and sandwich the left handlebar 17L therebetween, and in order to mount the first left handlebar switch case 20A on the left handlebar 17L, first and second metal fittings 28 and 29 are mounted on the left handlebar 17L so as to sandwich the left handlebar 17L therebetween.

The first metal fitting 28 has a front arc portion 28a that is fitted onto a front hemisphere of the left handlebar 17L and an upper flange portion 28b that extends upward from the upper end of the front arc portion 28a, and the second metal fitting 29 has a rear arc portion 29a that is fitted onto a rear hemisphere of the left handlebar 17L and upper and lower flange portions 29b and 29c that extend upward and downward from opposite ends of the rear arc portion 29a. A first latching hole 30 is formed in a part via which the rear arc portion 29a and the lower flange portion 29c of the second metal fitting 29 are connected, and an engagement projection 28c that is engaged with the first latching hole 30 is projectingly provided on a lower end part of the front arc portion 28a of the first metal fitting 28.

A positioning hole 31 for positioning the first left handlebar switch case 20A is formed in the left handlebar 17L; in this embodiment the positioning hole 31 is formed in a rear wall of the left handlebar 17L, and a pin 32 extending through the rear arc portion 29a of the second metal fitting 29 is inserted through the positioning hole 31, thus retaining the second metal fitting 29, and consequently the first and second metal fittings 28 and 29, at a fixed position with respect to the left handlebar 17L.

A front upper boss 33 and a front lower boss 34 projecting toward the rear case half body 27A side are projectingly provided integrally with upper and lower parts of the front case half body 26A, and a rear upper boss 35 and a rear lower boss 36 projecting toward the front case half body 26A side are projectingly provided integrally with upper and lower parts of the rear case half body 27A. The upper flange portions 28b and 29b of the first and second metal fittings 28 and 29 are sandwiched between the front upper boss 33 and the rear upper boss 35, and the lower flange portion 29c of the second metal fitting 29 is sandwiched between the front lower boss 34 and the rear lower boss 36.

Formed in the front upper boss 33 is an upper through hole 37 that is formed from an upper large diameter hole portion 37a opening on a front face of an upper part of the front case half body 26A and an upper small diameter hole portion 37b communicating coaxially with the upper large diameter hole portion 37a. Formed in the front lower boss 34 is a lower through hole 38 that is formed from a lower large diameter hole portion 38a opening on a front face of a lower part of the front case half body 26A and a lower small diameter hole portion 38b communicating coaxially with the lower large diameter hole portion 38a. On the other hand, a first nut 39 corresponding to the upper through hole 37 is mold bonded to the rear upper boss 35, and a second nut 40 corresponding to the lower through hole 38 is mold bonded to the rear lower boss 36. Screwing a first screw member 41 that is inserted through the upper through hole 37 and extends through the upper flange portions 28b and 29b of the first and second metal fittings 28 and 29 into the first nut 39 and screwing a second screw member 42 that is inserted through the lower through hole 38 and extends through the lower flange portion 29c of the second metal fitting 29 into the second nut 40 joins the front case half body 26A and the rear case half body 27A to each other to thus form the first left handlebar switch case 20A, and mounts the first left handlebar switch case 20A on the left handlebar 17L at a fixed relative position.

Disposed on the rear case half body 27A of the first left handlebar switch case 20A are a reverse switch 43, a direction indicator switch 44, a horn switch 45, a telephone switch 46, a screen raise/lower switch 47, a voice volume switch 48, a combination switch 49 for operating the navigation display device 25, etc., and disposed on the front case half body 26A of the first left handlebar switch case 20A is a dimmer switch 50.

Figure 5:
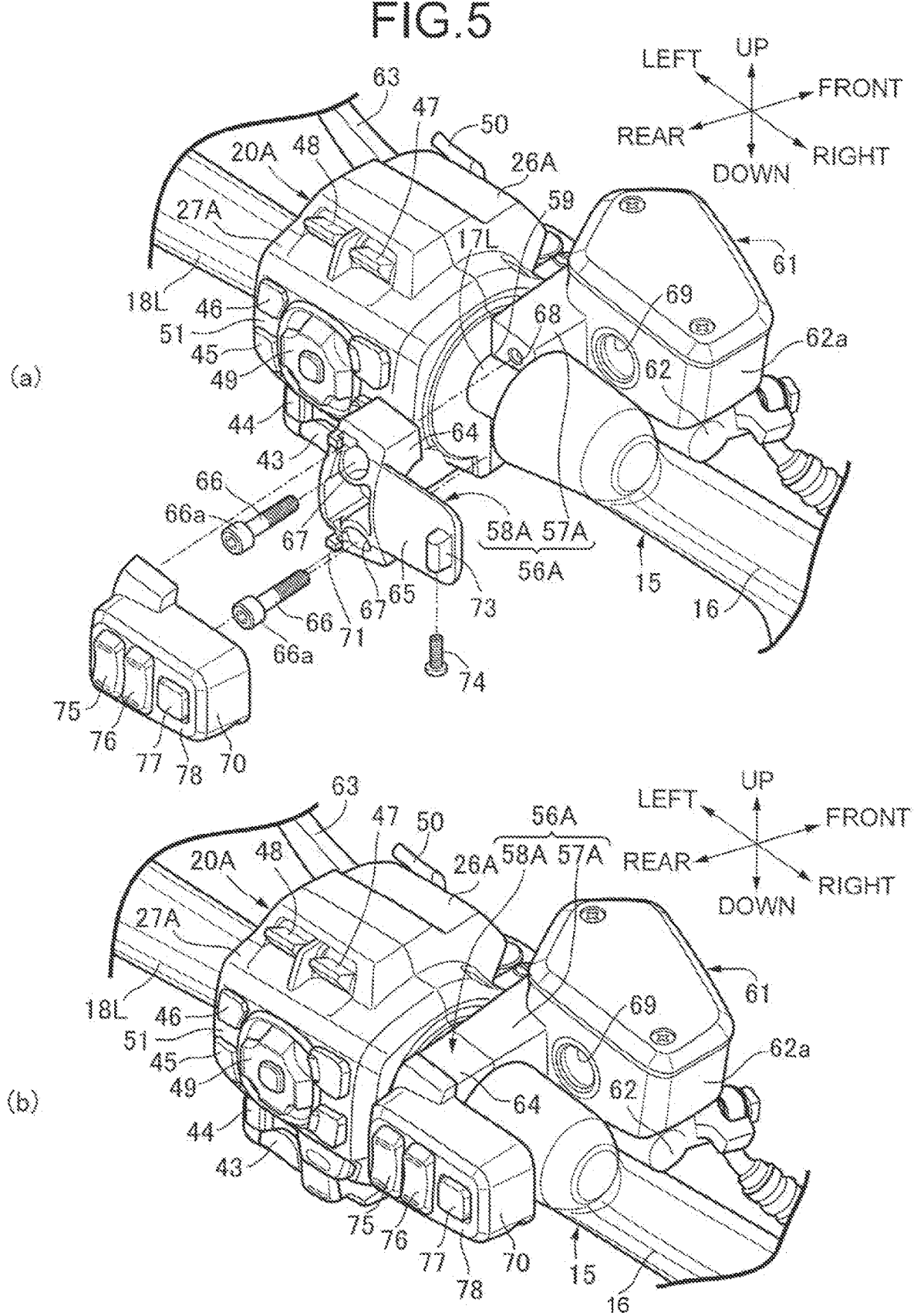
FIG. 5 is a perspective view from the rear and the inside in the vehicle width direction of the vicinity of the left handlebar comparing a disassembled state (a) in which a first sub switch and a first stay are disassembled and an assembled state (b). (first embodiment)
Figure 6:
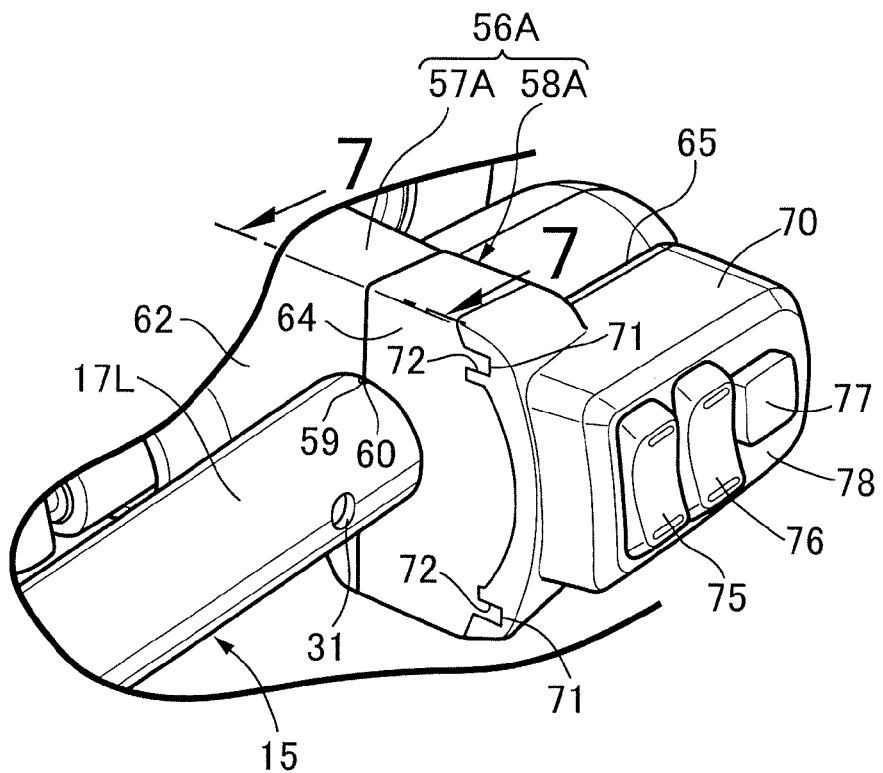
FIG. 6 is a perspective view from the rear and the outside in the vehicle width direction of the vicinity of the left handlebar in a state in which the left handlebar switch case is omitted. (first embodiment)
Figure 7:
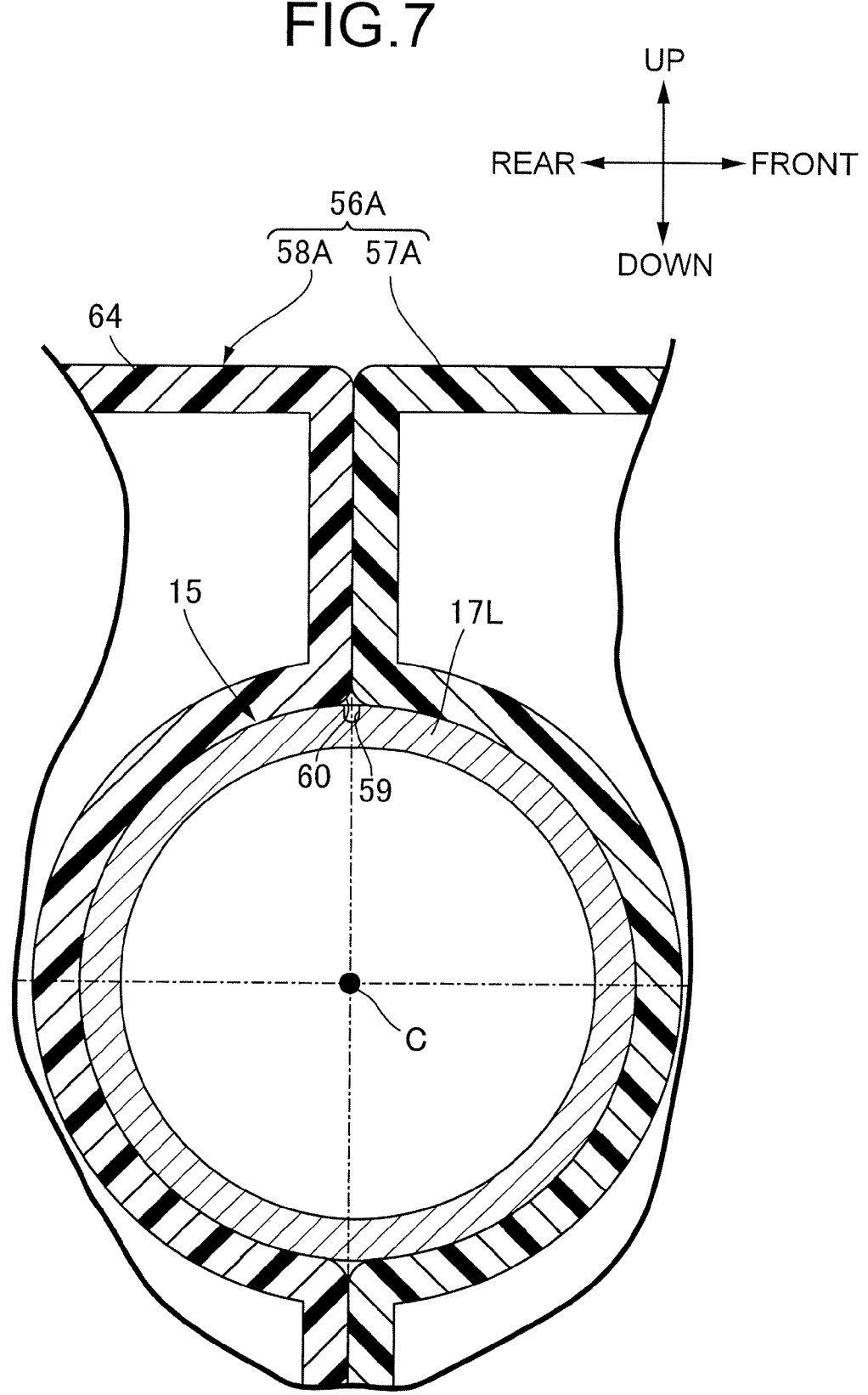
FIG. 7 is a sectional view of an essential part of the first stay along line 7-7 in FIG. 6. (first embodiment)

Referring in addition to FIG. 5 to FIG. 7, mounted on the left handlebar 17L is a first stay 56A at a fixed relative position with respect to the first left handlebar switch case 20A while being adjacent to the first left handlebar switch case 20A from the inside in the vehicle width direction.

The first stay 56A is formed from a first front stay 57A and a first rear stay 58A that is separably joined to the first front stay 57A while sandwiching the left handlebar 17L in the vehicle fore-and-aft direction between itself and the first front stay 57A. A positioning recess 59 for positioning the first stay 56A with respect to the first handlebar switch case 20A and the left handlebar 17L is formed in the left handlebar 17L, and in this embodiment as is clearly shown in FIG. 7 the positioning recess 59 is formed in an upper wall of the left handlebar 17L. This positioning recess 59 is disposed directly above a center C of the left handlebar 17L and at a position corresponding to the inner end in the vehicle width direction of the first handlebar switch case 20A, and the position of a corner 60, of an outer end part in the vehicle width direction of the first front stay 57A, that abuts against the upper wall of the left handlebar 17L is defined so as to coincide with the positioning recess 59.

The first front stay 57A is formed so as to be integrally connected to a cylinder body 62 of a clutch master cylinder 61 that connects and disconnects a starting clutch (not illustrated) of the two-wheeled motor vehicle, and has a substantially arc-shaped cross section so as to cover the left handlebar 17L from the front. A clutch lever 63 that is manually operated by a rider is pivotably supported on the first front stay 57A, and the clutch lever 63 extends to the front of the left handlebar grip 18L.

The first rear stay 58A is formed from an arc part 64 that covers the left handlebar 17L from the rear so as to sandwich the left handlebar 17L between itself and the first front stay 57A, and a rectangular plate-shaped support plate part 65 that is connectedly provided integrally with the arc part 64 so as to extend toward the side opposite to the left handlebar switch case 20A to the rear of the left handlebar 17L.

The first front stay 57A and the first rear stay 58A are fastened by a pair of bolts 66 disposed at positions sandwiching the left handlebar 17L in the vertical direction. A through hole 67 opening rearward is formed in upper and lower parts of the arc part 65 of the first rear stay 58A, and threaded holes 68 individually corresponding to the through hole 67 are formed in upper and lower parts of the first front stay 57A. The bolt 66 has at the rear end along the vehicle fore-and-aft direction an enlarged diameter head portion 66a that abuts against and engages with the first rear stay 58A, is inserted through the through hole 67, and is screwed into the threaded hole 68.

Joining faces of the first front stay 57A and the first rear stay 59 that are joined by the pair of bolts 66 are disposed at a position so that they are linearly aligned with joining faces of the front case half body 26A and the rear case half body 27A of the first left handlebar switch case 20A, and the first front stay 57A is matched to the positioning recess 59 in a way such that this is achieved.

The first rear stay 58A can support a first sub switch case 70, and in this embodiment the first sub switch case 70 is smaller than the first left handlebar switch case 20A. A fitting projection 71 projecting rearward is projectingly provided on each of upper and lower parts of a portion, toward the outside in the vehicle width direction, of the arc part 64 of the first rear stay 58A, and fitting recesses 72 into which the fitting projections 71 are each fitted are formed in the first sub switch case 70. A boss 73 is projectingly provided on a portion, toward the inside in the vehicle width direction, of the support plate part 65 of the first rear stay 58A, and screwing into the boss 73 a third screw member 74 that is inserted through a lower part of the first sub switch case 70 mounts the first sub switch case 70 on the first rear stay 58A.

When mounted on the first rear stay 58A, the first sub switch case 70 covers the enlarged diameter head portion 66a of the pair of bolts 66, which fasten the first rear stay 58A to the first front stay 57A. As is clearly shown in FIG. 3 the first sub switch case 70 is disposed so as to overlap part of the steering handle 15, including the left handlebar 17L, when viewed from the rear in the vehicle fore-and-aft direction.

The cylinder body 62 of the clutch master cylinder 61 integrally has a reserve tank 62a, and an inspection window 69 is provided in a rear wall along the vehicle fore-and-aft direction of the reserve tank 62a. On the other hand, the first sub switch case 70 is disposed to the rear in the vehicle fore-and-aft direction of the reserve tank 62a, and the relative positions of the inspection window 69 and the first sub switch case 70 are defined so that the inspection window 69 can easily be seen when the first sub switch case 70 is mounted on the first front stay 57A of the first stay 56A.

A plurality of sub switches related to CB wireless are disposed on the first sub switch case 70, and in this embodiment a wireless squelch switch 75, a wireless channel switch 76, and a CB switch 77 for switching CB wireless ON and OFF are disposed as sub switches in sequence from the outside in the vehicle width direction. Moreover, a face 78 of the first sub switch case 70 where the wireless squelch switch 75, the wireless channel switch 76, and the CB switch 77 are disposed is positioned so as to be substantially the same in the vehicle fore-and-aft direction as a face 51 of the rear case half body 27A of the first left handlebar switch case 20A where the reverse switch 43, the direction indicator switch 44, the horn switch 45, the telephone switch 46, and the combination switch 49 are disposed.

Among the wireless squelch switch 75, the wireless channel switch 76, and the CB switch 77, which are disposed on the first sub switch case 70, the wireless squelch switch 75 is the most frequently used, and the wireless channel switch 76 is the second most frequently used. The wireless squelch switch 75, which is very frequently used, is disposed at a position biased toward the left handlebar grip 18L side from a middle part of the first sub switch case 70 in the longitudinal direction of the left handlebar 17L, and in this embodiment as is clearly shown in FIG. 3 the wireless squelch switch 75 is disposed at a position that is biased further toward the left handlebar grip 18L side than a virtual plane PL that is orthogonal to the left handlebar 17L at a positon equally spaced from opposite ends of the first sub switch case 70 along the longitudinal direction of the left handlebar 17L by a distance L in the longitudinal direction of the left handlebar 17L, and with regard to the wireless channel switch 76 the positions of the wireless squelch switch 75 and the wireless channel switch 76 are set so that the virtual plane PL passes through a portion, close to the CB switch 77, of the wireless channel switch 76.

Figure 8:
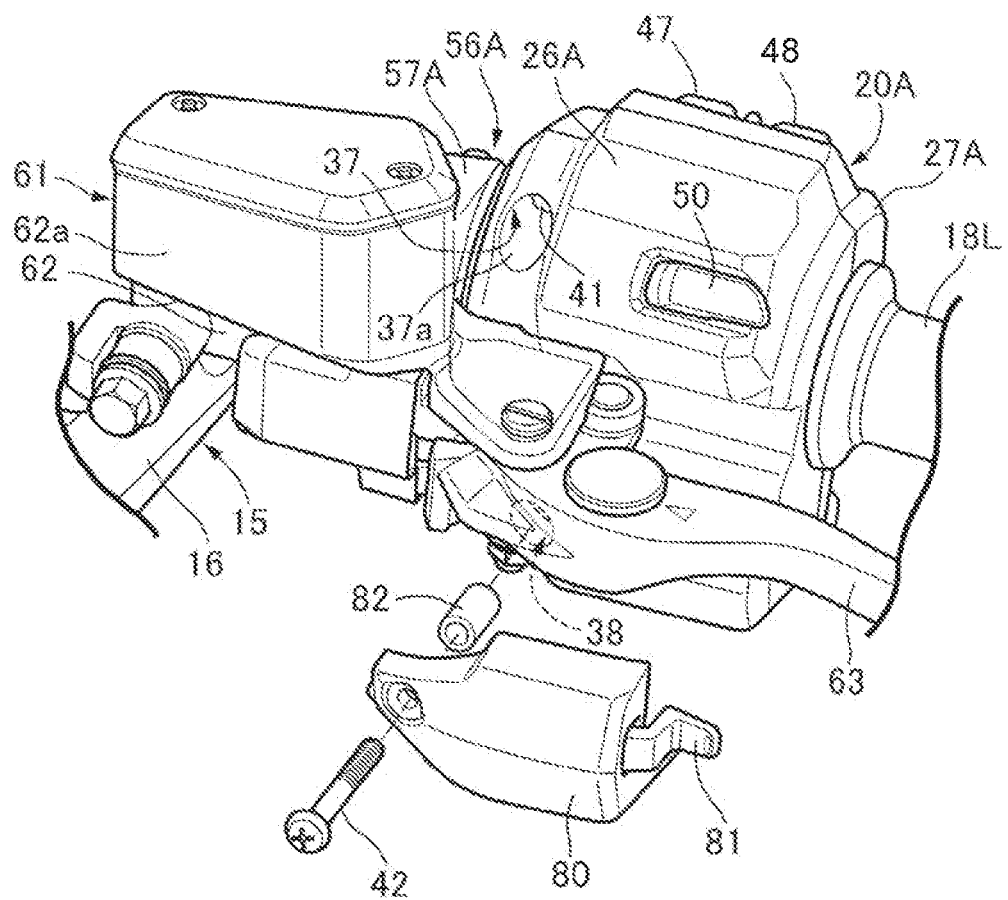
FIG. 8 is a perspective view from the front and the outside in the vehicle width direction of the vicinity of the left handlebar in a state in which a second sub switch case is separated. (first embodiment)
Figure 9:
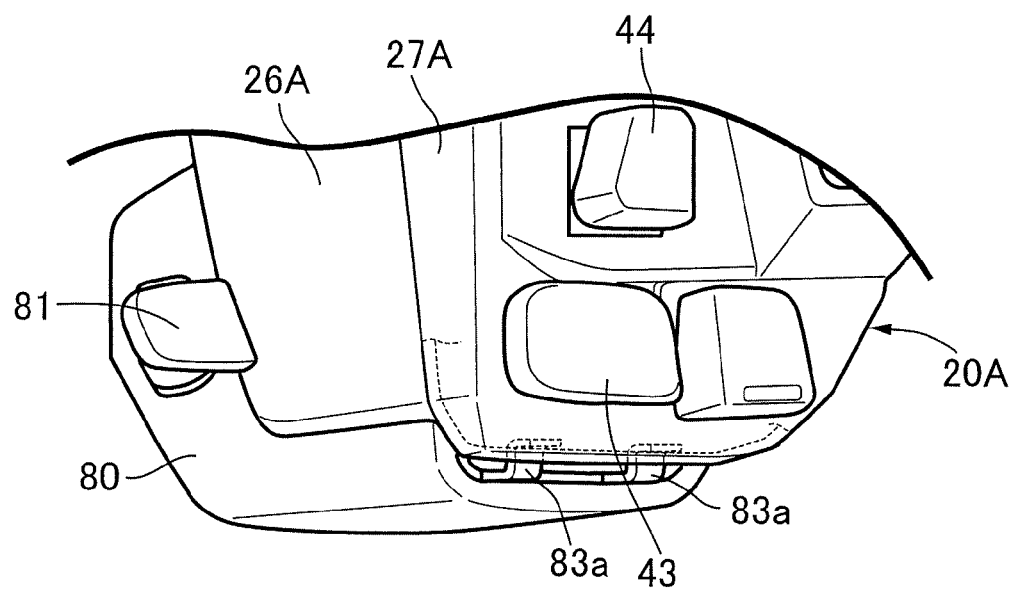
FIG. 9 is a perspective view from the direction of arrow 9 in FIG. 3. (first embodiment)

Referring in addition to FIG. 8 and FIG. 9, a second sub switch case 80, which is different from the first sub switch case 70, can be attached afterward to a front face in the vehicle fore-and-aft direction of the left handlebar switch case 20A.

Disposed on the second sub switch case 80 is a voice transmission switch 81 disposed on the outside in the vehicle width direction of the left handlebar switch case 20A when mounted on the left handlebar switch case 20A.

When mounting the second sub switch case 80 on the left handlebar switch case 20A, as is clearly shown in FIG. 4 a cylindrical collar 82, made of metal, is inserted into the lower large diameter hole portion 38a of the lower through hole 38 formed in the front lower boss 34 of the front case half body 26A of the left handlebar switch case 20A. On the other hand, a support plate 83, made of metal, having an upper end part abutting against the collar 82 is fixedly housed within the second sub switch case 80, and the first screw member 42 is inserted through the second sub switch case 80, the support plate 83, and the lower small diameter hole portion 38b of the lower through hole 38 and screwed into the second nut 40.

Furthermore, a pair of recesses 85 are formed at the front end of a lower part of the front case half body 26A of the first left handlebar switch case 20A, the pair of recesses 85 forming a pair of latching holes 84 spaced in the vehicle width direction between themselves and the rear end of a lower part of the rear case half body 27A. A pair of engagement claws 83a provided at the lower end of the support plate 83 are engaged with the latching holes 84.

Figure 11:
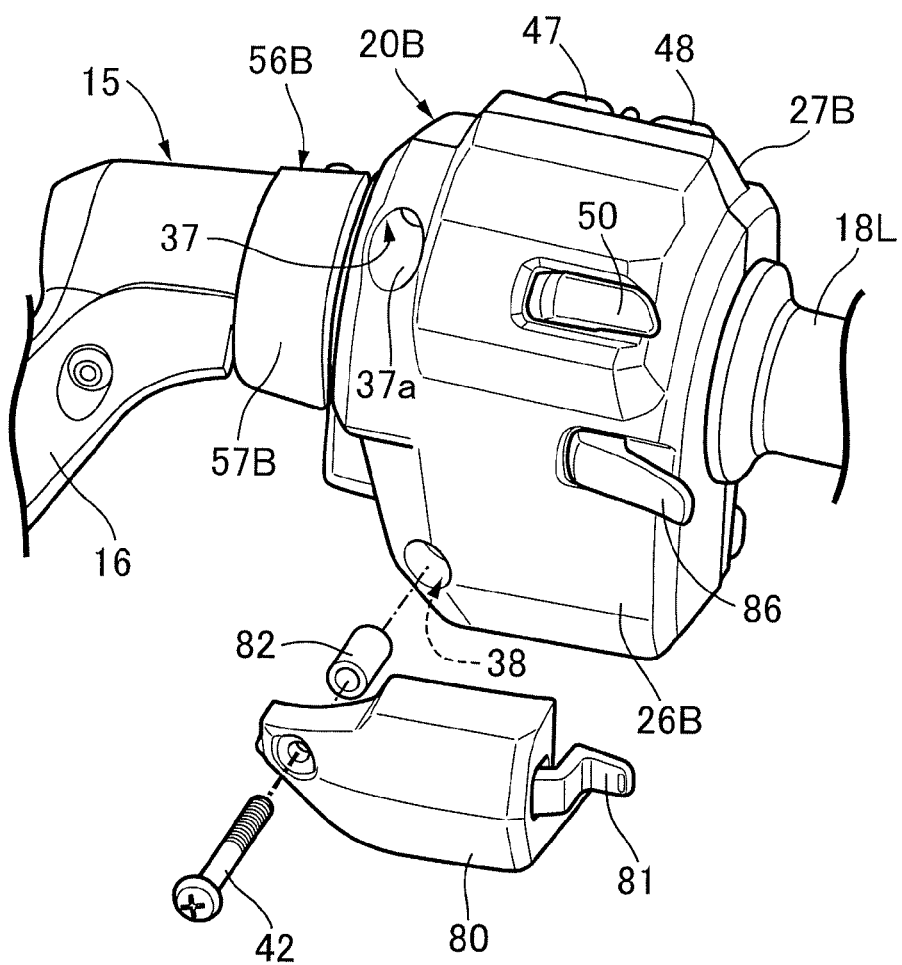
FIG. 11 is a perspective view, corresponding to FIG. 8, in a state in which the clutch master cylinder is not mounted. (first embodiment)

As shown in FIG. 10 and FIG. 11, there is a situation, depending on the two-wheeled motor vehicle, in which the clutch master cylinder 61 is not required, and in this situation, a second left handlebar switch case 20B that is adjacent to the inside in the vehicle width direction of the left handlebar grip 18L is mounted on the left handlebar 17L so as to be positioned by the positioning hole 31. The second left handlebar switch case 20B is formed by joining a front case half body 26B and a rear case half body 27B that are made of a synthetic resin and sandwich the left handlebar 17L therebetween. The dimmer switch 50 and a shift switch 86 are disposed on the front case half body 26B of the second left handlebar switch case 20B, the shift switch 86 being disposed in a space produced due to the clutch lever 63 being unnecessary, and the second sub switch case 80 can be attached to the front case half body 26B afterward.

Mounted on the left handlebar 17L is a second stay 56B that is at a fixed relative position with respect to the second left handlebar switch case 20B while being adjacent to the second left handlebar switch case 20B from the inside in the vehicle width direction. The second stay 56B is formed from a second front stay 57B and the first rear stay 58A, which is separably joined to the second front stay 57B while sandwiching the left handlebar 17L between itself and the second front stay 57B in the vehicle fore-and-aft direction.

A pair of threaded holes 87 are formed in the second front stay 57B, the bolt 66 inserted through the pair of through holes 67 formed in the first rear stay 58A being screwed into the threaded holes 87. Tightening the bolt 66 also mounts the second stay 56B on the left handlebar 17L while being positioned by the second positioning hole 59.

Figure 12:
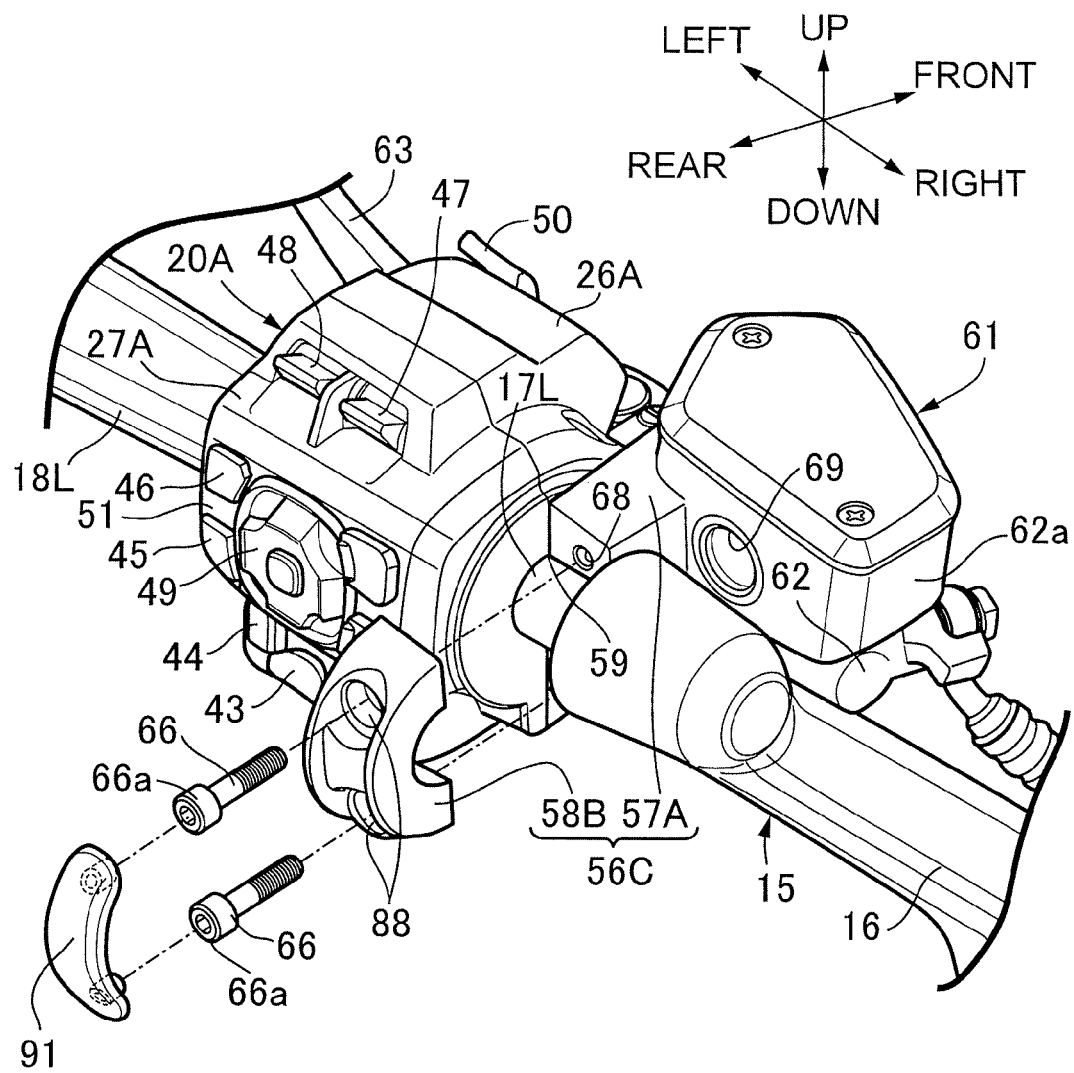
FIG. 12 is a perspective view from the rear and the inside in the vehicle width direction of the vicinity of the left handlebar, on which the first sub switch is not mounted. (first embodiment)
Figure 13:
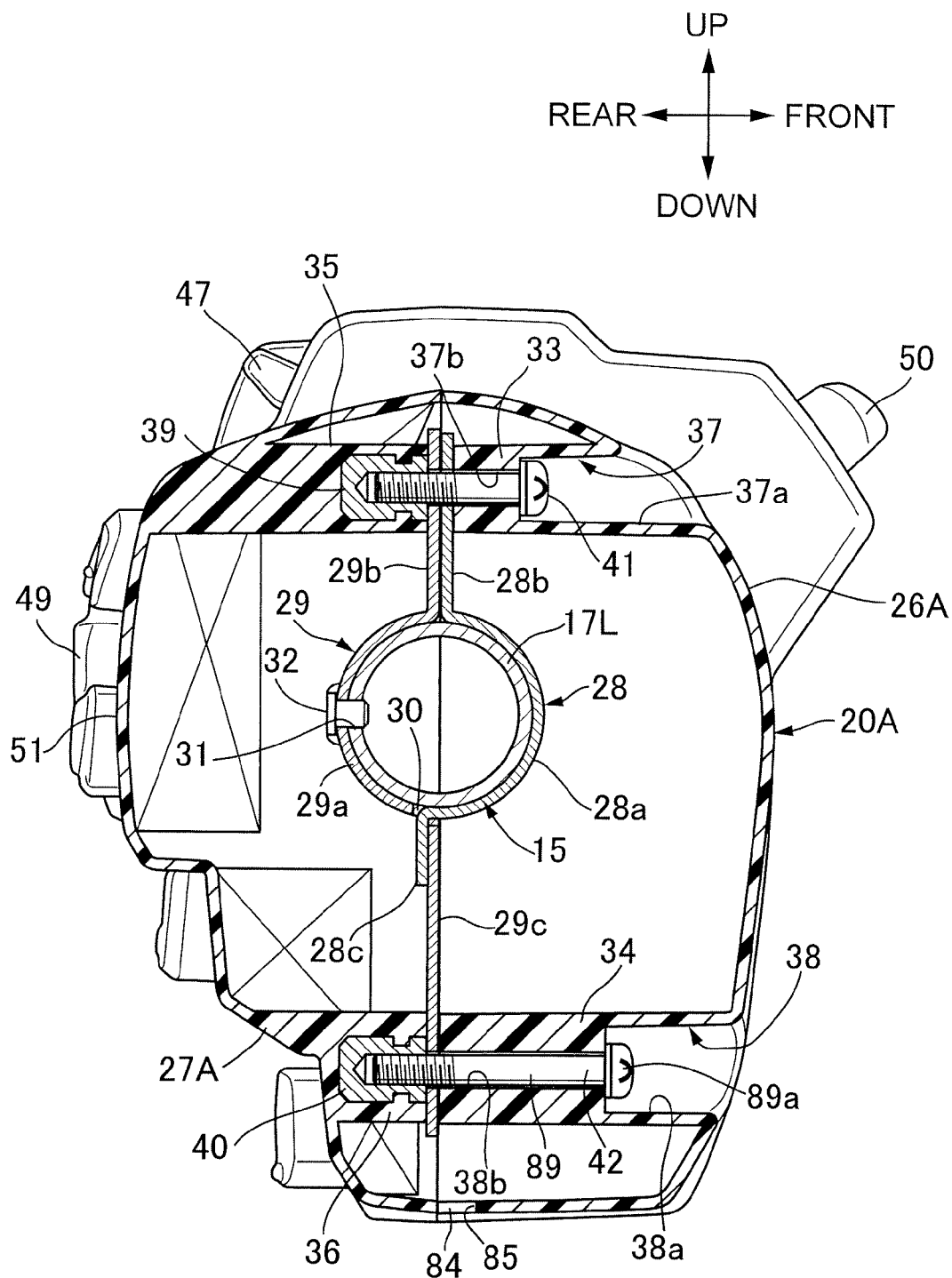
FIG. 13 is a sectional view, corresponding to FIG. 4, when the second sub switch case is not mounted. (first embodiment)

In a two-wheeled motor vehicle that is equipped with the clutch master cylinder 61 but does not require CB wireless, as shown in FIG. 12 a third stay 56C is mounted on the first left handlebar switch case 20A at a fixed relative position with respect to the first left handlebar switch case 20A while being adjacent thereto from the inside in the vehicle width direction. This third stay 56C is formed from the first front stay 57A and a second rear stay 58B, the second rear stay 58B being separably joined to the first front stay 57A while sandwiching the left handlebar 17L in the vehicle fore-and-aft direction between itself and the first front stay 57A.

The second rear stay 58B is for a situation where supporting the first sub switch case 70 is not required, and is formed so as to have a shape corresponding substantially to the arc part 64 of the first rear stay 58A, and a pair of through holes 88 are formed in the second rear stay 58B, the bolt 66 screwed into the threaded hole 68 of the first front stay 57A being inserted through the through holes 88. The enlarged diameter head portion 66a of the pair of the bolts 66 is covered by a cap 91, made of a synthetic resin, for example polypropylene, detachably mounted by being inserted into the enlarged diameter head portion 66a.

In this situation, it is unnecessary to attach the second sub switch case 80 to the first left handlebar switch case 20A afterward, and the collar 82 shown in FIG. 4 is not inserted into the lower large diameter hole portion 38a of the lower through hole 38 formed in the front lower boss 34 of the front case half body 26A of the first left handlebar switch case 20A. As is clearly shown in FIG. 13, a third screw member 89 is inserted through the small diameter hole portion 38b of the lower through hole 38 and screwed into the second nut 40, an enlarged diameter head portion 89a of the third screw member 89 being housed in the lower large diameter hole portion 38a of the lower through hole 38.

Figure 14:
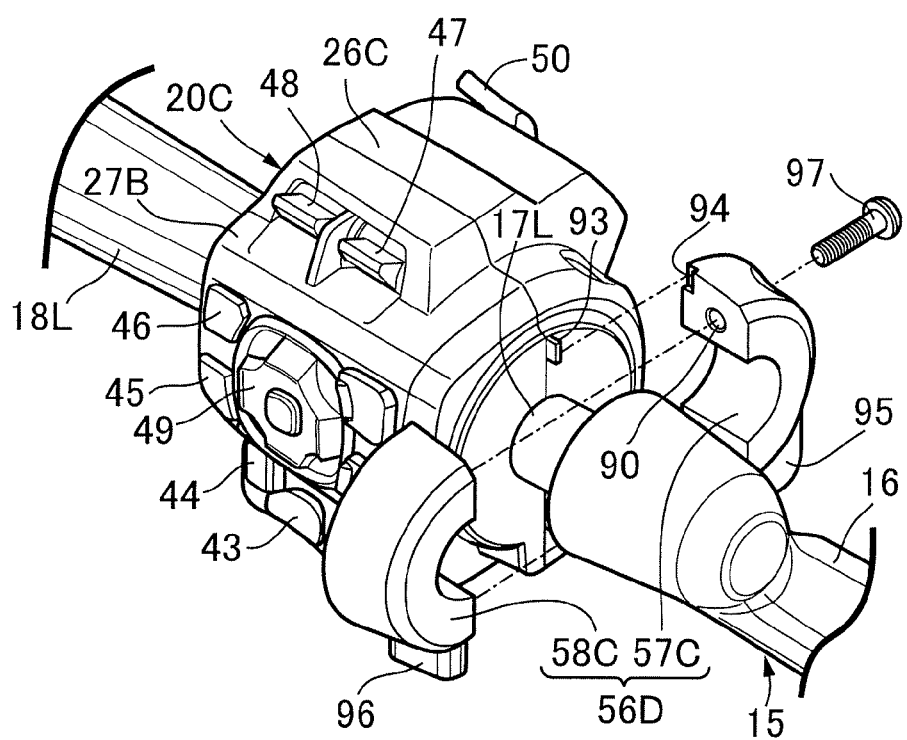
FIG. 14 is a perspective view from the rear and the inside in the vehicle width direction of the vicinity of the left handlebar when the clutch master cylinder and the second sub switch case are not mounted. (first embodiment)

As shown in FIG. 14, there is a situation, depending on the two-wheeled motor vehicle, in which both the clutch master cylinder 61 and the CB wireless are not required, and in this situation a third left handlebar switch case 20C that is adjacent to the inside in the vehicle width direction of the left handlebar grip 18L is mounted on the left handlebar 17L so as to be positioned by the positioning hole 31, and a fourth stay 56D that is adjacent to the third left handlebar switch case 20C from the side opposite to the left handlebar grip 18L is mounted on the left handlebar 17L.

The third left handlebar switch case 20C is formed by joining to each other a front case half body 26C and the rear case half body 27B that are made of a synthetic resin and sandwich the left handlebar 17L therebetween, and the dimmer switch 50 and the shift switch 86, which is disposed in a space produced due to the clutch lever 63 being unnecessary, are disposed on the front case half body 26C of the third left handlebar switch case 20C.

The fourth stay 56D is formed from a third front stay 57C and a third rear stay 58C that is separably joined to the third front stay 57C while sandwiching the left handlebar 17L in the vehicle fore-and-aft direction between itself and the third front stay 57C.

A positioning projection 93 projecting toward the fourth stay 56D side is projectingly provided on an upper part at the inner end in the vehicle width direction of the front case half body 26C of the third left handlebar switch case 20C, and a positioning recess 94 is formed in an upper part at the inner end in the vehicle width direction of the third front stay 57C, the positioning projection 93 being fitted into the positioning recess 94. Fitting the positioning projection 93 into the positioning recess 94 positions the fourth stay 56D with respect to the third left handlebar switch case 20C.

Projections 95 and 96 projectingly provided integrally with lower parts of the third front stay 57C and the third rear stay 58C respectively are engaged with each other, a through hole 90 is formed in the third front stay 57C above the left handlebar 17L, the bolt 97 being inserted through the through hole 90, and the bolt 97 inserted though the through hole 90 is screwed into the third rear stay 58C.

As described above, the first or third stay 56A or 56C is mounted on the left handlebar 17L at a fixed relative position with respect to the first handlebar switch case 20A while being adjacent to the first left handlebar switch case 20A from the inside in the vehicle width direction, the first or third stay 56A or 56C being formed from a combination between the first front stay 57A and the first or second rear stay 58A or 58B. The second stay 56B formed from the second front stay 57B and second rear stay 58B or the fourth stay 56D formed from the third front stay 57C and third rear stay 57C is mounted on the left handlebar 17L at a fixed relative position with respect to the first handlebar switch case 20A while being adjacent to the second or third left handlebar switch case 20B or 20C from the inside in the vehicle width direction. A selected rear stay from a plurality of types (in this embodiment three types) of rear stays 58A, 58B, and 58C, including the first rear stay 58A, which is a specific rear stay that can support the first sub switch case 70, is separably joined to the front stays 57A to 57C sandwiching the left handlebar 17L in the vehicle fore-and-aft direction.

The operation of the embodiment is now explained; the first sub switch case 70 is supported on the first stay 56A or the second stay 56B, which are selected from a plurality of types (four types in this embodiment) of first to fourth stays 56A to 56D that can be mounted on the left handlebar 17L at a fixed relative position with respect to the first left handlebar switch case 20A, the second left handlebar switch case 20B, or the third left handlebar switch case 20C while being adjacent to the first, second, or third left handlebar switch case 20A to 20C from the inside in the vehicle width direction, and in this embodiment, even when the first sub switch case 70 is provided in addition to the first left handlebar switch case 20A or the second left handlebar switch case 20B, the position of the first left handlebar switch case 20A or the second left handlebar switch case 20B and the position of the first sub switch case 70 with respect to the left handlebar grip 18L can be maintained fixed with good precision, thus enhancing the ease of operation.

Furthermore, since the first to fourth stays 56A to 56D are formed from the first to third front stays 57A to 57C and the first to third rear stays 58A to 58C, which are selected from a plurality of kinds including the first rear stay 58A as a specific rear stay that can support the first sub switch case 70 and are separably joined to one of the front stays 57A to 57C while sandwiching the left handlebar 17L in the vehicle fore-and-aft direction between themselves and the first to third front stays 57A to 57C, and any one of the first to third front stays 57A to 57C and the first to third rear stays 58A to 58C (in this embodiment the first to third front stays 57A to 57C) is fixed to the left handlebar 17L at a fixed relative position with respect to the first left handlebar switch case 20A, the second left handlebar switch case 20B, or the third left handlebar switch case 20C, it is possible to mount the first to fourth stays 56A to 56D on the left handlebar 17L at a fixed relative position with respect to the first, second, or third left handlebar switch case 20A, 20B, or 20C with a structure that is inexpensive and easy to use, and it is possible to use the first front stay 57A in common between a situation in which the first sub switch case 70 is provided and a situation in which it is not, thus enhancing the multi-purpose feature of the first front stay 57A and thereby reducing the cost.

Moreover, since the first sub switch case 70 is disposed so as to be adjacent to the first or second left handlebar switch case 20A or 20B from the inside in the vehicle width direction, the operability of a switch disposed on the first or second left handlebar switch case 20A or 20B, in this embodiment the reverse switch 43, the direction indicator switch 44, the horn switch 45, the telephone switch 46, the screen raise/lower switch 47, the voice volume switch 48, the combination switch 49, the dimmer switch 50, or the shift switch 81, will not be impeded by the first sub switch case 70, thus enabling the operability to be maintained.

Furthermore, since the first sub switch case 70 is disposed so as to overlap part of the steering handle 15, including the left handlebar 17L, when viewed from the rear in the vehicle fore-and-aft direction, the first sub switch case 70 is disposed at substantially the same height as the left handlebar 17L, and the rider can easily operate with a thumb a sub switch disposed on the first sub switch case 70, in this embodiment the wireless squelch switch 75, the wireless channel switch 76, and the CB switch 77, thus enhancing the ease of operation and avoiding narrowing the field of view of the rider due to the first sub switch case 70 being added.

Moreover, since the first rear stay 58A is fastened to the first or second front stay 57A or 57B by means of the bolt 66 having at the rear end along the vehicle fore-and-aft direction the enlarged diameter head portion 66a, which abuts against and engages with the first rear stay 58A, and the first sub switch case 70 is mounted on the first rear stay 58A so as to cover the enlarged diameter head portion 66a, the appearance is improved.

Furthermore, since among the wireless squelch switch 75, the wireless channel switch 76, and the CB switch 77, which are a plurality of sub switches disposed on the first sub switch case 70, a sub switch that is very frequently used (in this embodiment the wireless squelch switch 75) is disposed at a position that is biased toward the left handlebar grip 18L side from a middle part of the first sub switch case 70 in the longitudinal direction of the left handlebar 17L, the rider can easily operate the wireless channel switch 76, which is very frequently used.

Moreover, since one selected from the plurality of types (three types in this embodiment) of front stays 57A to 57C, including the first front stay 57A, as a specific front stay supporting the clutch lever 63, which is manually operated by the rider, is joined to one of the first to third rear stays 58A to 58C, the first front stay 57A forms part of the first stay 56A, which has a fixed position with respect to the left handlebar grip 18L or the first left handlebar switch case 20A defined with good precision, and the ease of operation of the clutch lever 63 can be enhanced by defining the relative position of the clutch lever 63 with respect to the left handlebar grip 18L and first left handlebar switch case 20A with good precision. Furthermore, the first front stay 57A, which supports the clutch lever 63, and the second front stay 57B, which is a front stay not supporting the clutch lever 63, share the first rear stay 58A, thus reducing the cost.

Furthermore, since the second sub switch case 80, which is different from the first sub switch case 70, can be attached afterward to the front face in the vehicle fore-and-aft direction of the first left handlebar switch case 20A or the second left handlebar switch case 20B, it is possible to use the first left handlebar switch case 20A or the second handlebar switch case 20B in common between a situation in which the second sub switch case 80 is provided and a situation in which it is not, and by so doing the cost can be reduced.

An embodiment of the present invention is explained above, but the present invention is not limited to the above embodiment and may be modified in a variety of ways as long as the modifications do not depart from the spirit and scope thereof.

The invention claimed is:

1. A handlebar switch device for a saddled vehicle in which a handlebar switch case and a handlebar grip that is disposed on an outside in a vehicle width direction of the handlebar switch case are mounted on a handlebar forming part of a steering handle, wherein a sub switch case is supported on a stay that is selected from a plurality of kinds of stays that can be mounted on the handlebar at a fixed relative position with respect to the handlebar switch case while being adjacent to the handlebar switch case from an inside in the vehicle width direction,
wherein the stay is formed from a front stay and a rear stay, the rear stay being selected from a plurality of kinds of rear stays including a specific rear stay that can support the sub switch case and being separably joined to the front stay with the handlebar sandwiched between the rear stay and the front stay in a vehicle fore-and-aft direction, and
wherein the specific rear stay is fastened to the front stay by means of a bolt having at a rear end in the vehicle fore-and-aft direction an enlarged diameter head portion that abuts against and engages with the specific rear stay, and the sub switch case is mounted on the specific rear stay so as to cover the enlarged diameter head portion.

2. The handlebar switch device for a saddled vehicle according to claim 1, wherein the sub switch case is disposed so as to be adjacent to the handlebar switch case from the inside in the vehicle width direction.

3. The handlebar switch device for a saddled vehicle according to claim 1, wherein the sub switch case is disposed so as to overlap part of the steering handle, including the handlebar, when viewed from a rear in a vehicle fore-and-aft direction.

4. The handlebar switch device for a saddled vehicle according to claim 1, wherein a plurality of sub switches is disposed on the sub switch case, and among the sub switches a sub switch that is used at high frequency is disposed at a position biased toward the handlebar grip side from a middle part of the sub switch case in a longitudinal direction of the handlebar.

5. The handlebar switch device for a saddled vehicle according to claim 1, wherein one selected from the plurality of kinds of front stays, including a specific front stay that supports a clutch lever manually operated by a rider, is joined to the rear stay.

6. The handlebar switch device for a saddled vehicle according to claim 1, wherein a second sub switch case that is different from the sub switch case can be mounted afterward on a front face in the vehicle fore-and-aft direction of the handlebar switch case.

* * * * *